Jan. 9, 1940.  M. E. SALISBURY  2,186,537
FLOATING SEAL ASSEMBLY
Filed April 27, 1938  2 Sheets-Sheet 1
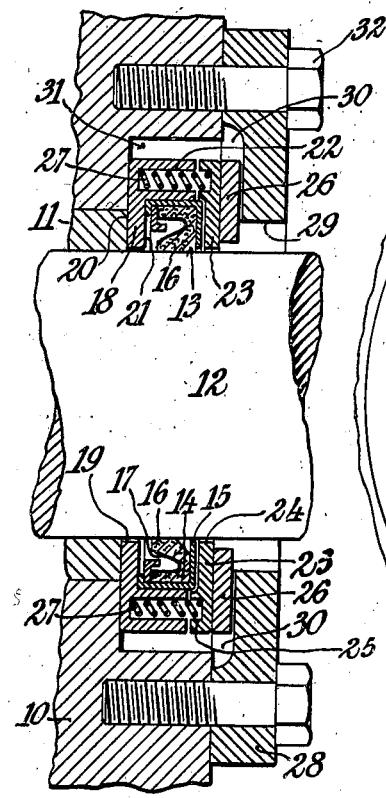
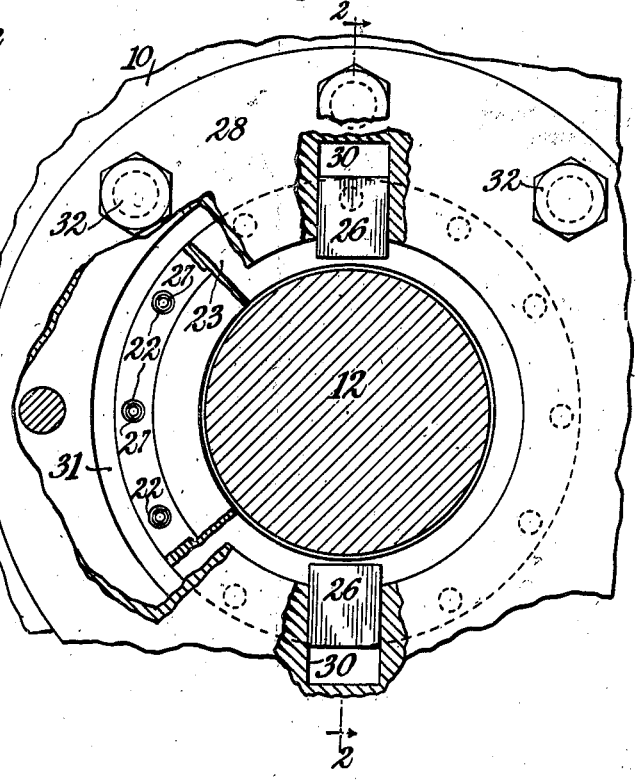
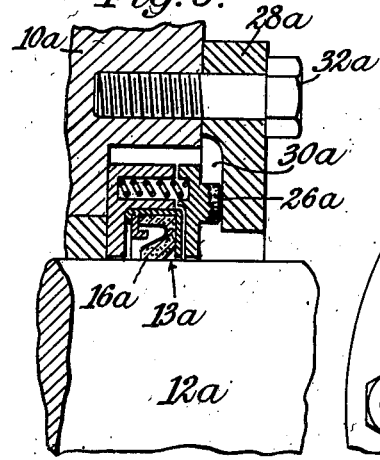
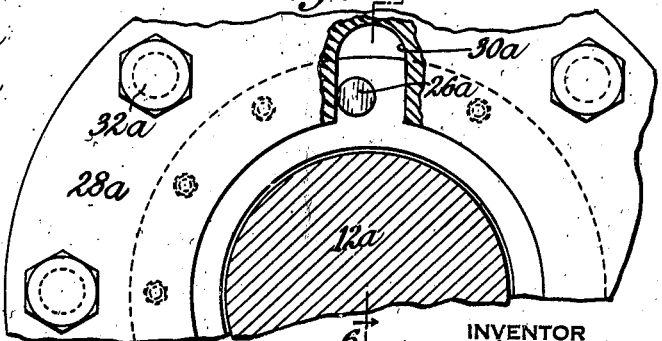
INVENTOR
Maxwell E. Salisbury,
BY
Fraser, Myers & Manley
ATTORNEYS.

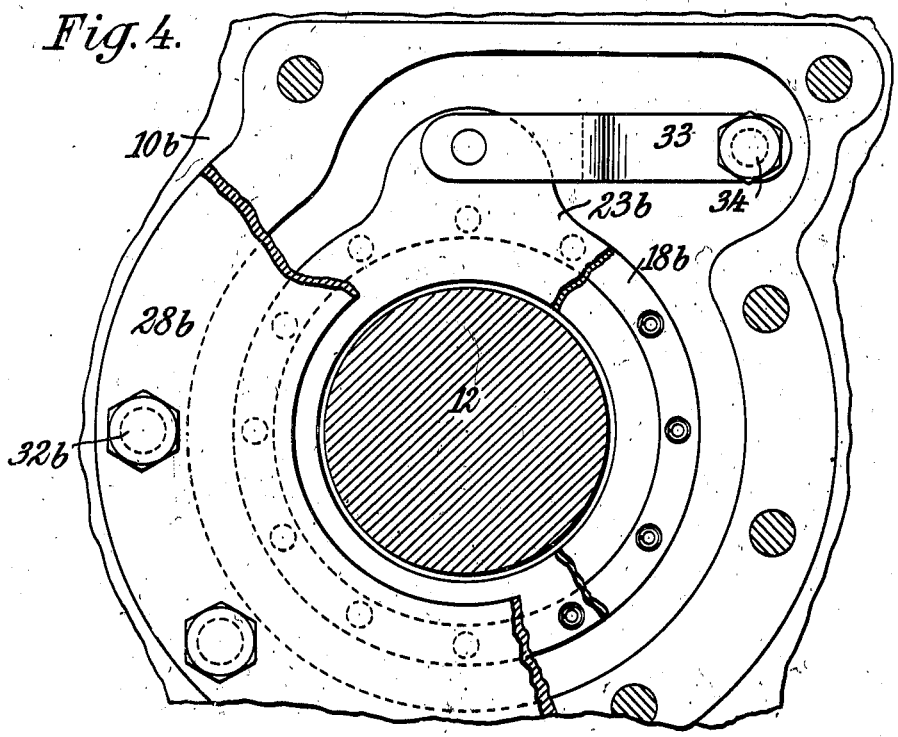
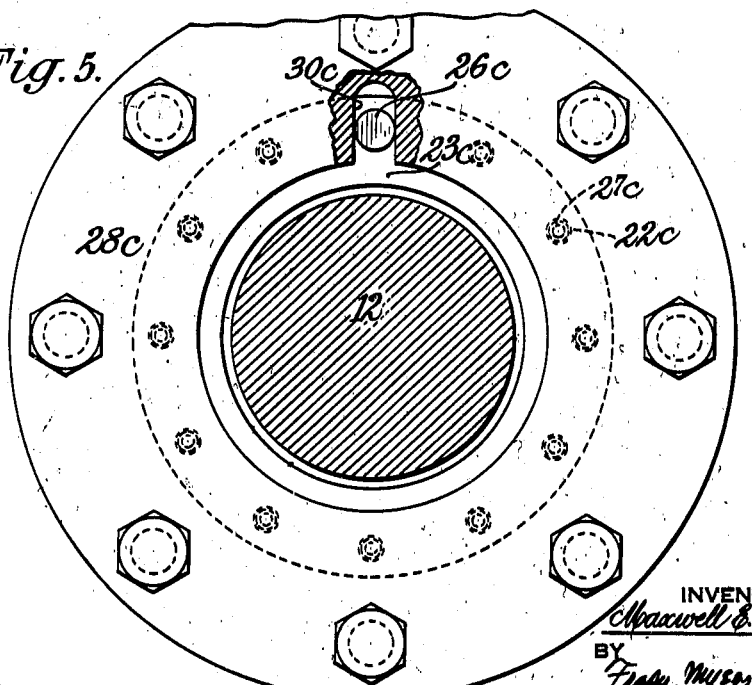

Patented Jan. 9, 1940

2,186,537

UNITED STATES PATENT OFFICE 2,186,537

FLOATING SEAL ASSEMBLY

Maxwell E. Salisbury, Palmyra, N. Y., assignor to The Garlock Packing Company, Palmyra, N. Y., a corporation of New York Application April 27, 1938, Serial No. 204,634

3 Claims. (Cl. 286—30)

This invention relates to improvements in sealing assemblies adapted in general for use in closing the annular space between a pair of relatively rotatable machine elements, such as that between a rotating shaft and its stationary supporting element, to prevent the escape of grease, oil, or other lubricating fluid.

The principal object of the invention is to provide an assembly of this character which, when positioned over a shaft in sealing relation with it and with the adjacent machine element, is yet capable of limited movement in a radial direction such as will permit the assembly to accommodate itself to corresponding radial movements of the shaft, that is, to float with the shaft, without destroying the seal or subjecting the parts of the assembly to excessive stress and wear.

It is a further object of the invention to provide an assembly comprising a unitary sealing element of a readily replaceable nature having an annular sealing lip of flexible packing material adapted to wipe a machine shaft, for example, and form a seal at that point, and a mounting for the element having a surface capable of engaging a complemental face of an adjacent machine element in sliding, but also sealing relation in such manner that the element and its mounting may move with the shaft in a radial direction as the journals supporting the shaft wear away.

The full nature of the invention, as well as other objects and various features thereof, may be more fully understood from a consideration of the following description in the light of the accompanying drawings, in which:

Figure 1 is an end elevational view of a fragment of a machine showing one form of sealing assembly embodying the invention applied thereto with certain parts broken away better to show the underlying ones;

Fig. 2 is a sectional view taken on the line 2—2 of Fig. 1;

Figs. 3, 4 and 5 are elevational views of a fragment of a machine, similar to Fig. 1, illustrating the application of modified forms of sealing assemblies embodying the invention, with certain parts again broken away better to show underlying ones; and Fig. 6 is a sectional view taken on the line 6—6 of Fig. 3.

In the drawings Figs. 1 and 2 represent a fragment of a machine including a housing member 10 having an opening therein lined with babbitt, brass or similar metal to serve as a bearing 11 for the rotating shaft 12, and a sealing assembly including an element, generally designated 13, surrounding the shaft and sealing the opening in the housing for the purpose of retaining grease, oil or other lubricating fluid within the bearing where it is needed.

The sealing element 13 is preferably of a standard unitary type which may readily be replaced when worn. As here shown, it comprises a ring of packing material having a body portion 14 suitably held by the flanges of a shell 15, and a flexible sealing lip 16 adapted to be pressed into wiping contact with the shaft 12 by a resilient spreader member 17. The constructional details of this element form no part of the present invention for almost any type of unitary seal may be used with equally good results. Examples of several different forms which are applicable will be found in Patents Nos. 1,893,814; 1,942,705; 1,969,008; 1,969,797; and others.

The bearings 11 may be subjected to excessively heavy loads, and accordingly wear rapidly. In a rolling mill, for example, it is not unusual to find that the "brasses" have worn out-of-round by three-eighths of an inch or more, and that the shaft, of course, has dropped from its initial position by an equal amount. If, under such condition, the sealing element were rigidly mounted in the housing, in the usual way, then obviously its lip would be utterly ruined within a very short time. Aside from the cost of replacement, its destruction would result in the loss of lubricant, etc.

In order to prevent such undue wear, the assembly of the present invention includes a mounting for the unitary sealing element which is capable of limited radial movement whereby it, and the element, may float with the shaft and maintain the various parts properly centered with respect to each other.

In one preferred form (Figs. 1 and 2) the mounting comprises an annular cage 18 having a central shaft opening or bore 19, a plane rear surface 20, a cylindrical recess 21 in its front face, and a circular series of pockets 22 surrounding the recess; a cap 23 provided with a central bore 24, a circular series of pockets 25 in its rear face matching those in the cage, and a pair of radially disposed lugs 26 projecting outwardly from its front face; a plurality of coil springs 27 adapted to be seated within the pockets of the cage and cap; and a cover plate 28 having a central bore 29, and a pair of grooves 30 in its rear face extending radially from the bore 29 and adapted to receive and cooperate with the lugs of the cap member.

The recess 21 of the cage is, of course, designed to receive the sealing element of the assembly. In the preferred embodiments, its diameter is intentionally somewhat less than that of the sealing element; and the latter must necessarily be pressed into the recess so that the outer surfaces of its shell engage the adjacent surfaces of the cage in leak-tight relation.

After the insertion of the sealing element 13, the cage 18 and the cap 23 may be slipped over the shaft 12, and disposed within the somewhat larger cylindrical chamber 31 formed in the housing surrounding the bearing 11 and the shaft; and the cover plate 28 may then be applied to the housing, screws 32 being provided for that purpose. In this assembled relation (Fig. 2), the flexible sealing lip 16 wipes the shaft to form a seal there, while the bores 19 and 24 of the cage and cap, respectively, make a running fit with the shaft.

In the operation of the machine, as the bearings wear away and the shaft progressively drops from its initial position to new ones, the cage and cap move with it and thus keep the sealing lip and the shaft constantly centered and in effective sealing relation. This movement, however, has no effect upon the seal between the rear surface of the cage and the adjacent surface of the housing for these parts are constantly pressed into engagement by the various springs 27. The lugs, of course, prevent rotation of the cap, and through the springs, such movement on the part of the cage. It is evident from the foregoing that the assembly, including the unitary sealing element and the mounting, effectively closes the shaft opening in the housing, keeps it closed at all times to prevent the loss of lubricant, and yet permits the various parts to float with the shaft thus to avoid undue wear.

It has been assumed, in the foregoing, that radial movement of the shaft is due entirely to the wearing of the bearings. That is not necessarily so, for there are many machines wherein a relatively long shaft, running at fairly high speeds, or one wherein the bearings have worn badly in a horizontal as well as in a vertical direction, will whip to a greater or lesser extent. The major component of the whip is usually in a vertical direction, but it may also have a horizontal component.

An assembly, including a unitary sealing element and the mounting therefor, adapted to float in a horizontal as well as in a vertical direction, is illustrated in Figs. 3 and 6. The principal difference between this device and the one hereinbefore described will be found in the fact that the lugs are somewhat narrower than the slots in which they are confined, the difference between these dimensions roughly approximating the extent of lateral, or horizontal, whip. In this modification the lugs preferably take the form of small round pins 26a; and the slots 30a in the cover plate 28a are much larger and of oval shape. The relative proportions and constructional details may best be seen in Fig. 3.

In operation, frictional contact between the shaft 12a and the sealing lip 16a, tends to rotate the entire cage and cap with the shaft, and thus to hold the pins 26a in engagement with the sides of the slots 30a. Any whip of this shaft, however, in either a vertical or a lateral direction, will be met by a corresponding movement of the cage and cap; and the sealing lip will then be maintained constantly centered with the shaft.

Another assembly, which is capable of universal movement to accommodate both vertical and lateral components of shaft whip, is illustrated in Fig. 4. In that arrangement either the cage 18b or the cap 23b is linked at 33 to a pin 34 carried by a stationary part of the machine, either the housing member 10b or the cover plate 28b, as may be most convenient. The assembly, of course, may move up or down with the shaft, or crosswise thereof, and the link serves only to prevent rotation.

A further modification providing for universal floating of the sealing assembly is shown in Fig. 5. This embodiment of the invention represents a combination of the features of the devices hereinbefore described. Briefly, the cap 23c of this device is provided with but a single pin or lug 26c for preventing rotation, and that pin is of circular cross section adapted to fit within a slot 30c in the cover plate 28c with a minimum clearance. In other respects this modification may be substantially identical with the device shown in Figs. 1 and 2, heretofore described.

In operation, the pin 26c merely serves as a sliding fulcrum, permitting the cage and cover to move up or down or crosswise with the shaft in the desired manner. It is, of course, simpler than the arrangements of Figs. 3, 4 and 6; and in addition, there is no possibility that its pin will chatter against the sides of the slot as might happen with the device of Figs. 3 and 6.

Since certain changes may be made in the embodiments of the invention which are well within the skill of the ordinary mechanic, it is intended that the foregoing shall be construed in a descriptive rather than in a limiting sense.

What I claim is:

1. An assembly for sealing the annular space between a machine element and a relatively rotatable shaft passing through an opening in the element, comprising: an annular cage having its central bore adapted to make running fit with the shaft, a rear plane face adapted to engage an opposing plane surface of the machine element in sliding but leak-tight contact, and a cylindrical recess in its front face concentric with its bore; a unitary sealing element of cylindrical proportions disposed within the recess of the cage with its outer surfaces making leak-tight contact with the adjacent surfaces of the cage and having a flexible sealing lip adapted to make wiping contact with the machine shaft; a cover element adapted to be positioned over the cage and to be affixed to the machine element, said cover having a centrally located opening of such dimensions as to receive the shaft and to permit radial movement of the shaft without engaging the cover, means between the cover and cage permitting radial movement of the latter while preventing rotation thereof; and a plurality of resilient elements located between and reacting against said cover and cage to press the plane rear surface of the cage into leak-tight contact with an adjacent plane surface of the machine element.

2. An assembly according to claim 1 further characterized in that said means comprise an annular cap having its central bore adapted to make running fit with the shaft, and a lug extending forwardly from its front face; in that the cover has a radially disposed groove in its rear face adapted to accommodate the lug of the cap, said lug and groove being of such relative dimensions that the former may slide in the latter to provide for radial movement of the cap; and in that the resilient elements are located between the front surface of the cage and the rear surface of the cap.

3. An assembly for sealing the annular space between a machine element and a relatively rotating shaft passing through an opening therein, comprising: an annular cage having its central bore adapted to make running fit with the shaft of the machine, a rear plane face, adapted to engage an adjacent plane surface of the machine element in sliding but leak tight relation, a cylindrical recess in its front face concentric with its bore, and a series of pockets formed at arcuately spaced points in its front face surrounding the recess; a unitary seal element disposed in the recess with an outer cylindrical surface making leak-tight contact with a like surface of the cage, and having a flexible sealing lip adapted to make wiping contact with the shaft; an annular cap positioned over the cage with its central bore adapted to make running fit with the shaft, and having series of pockets in its rear face matching the pockets in the opposing front face of the cage, and a lug extending axially from its front face; a cover element adapted to be positioned over the cage and cap and to be affixed to the machine element, said cover having a centrally located opening of such dimensions as to receive and permit radial movement of the shaft without engaging the cover, and a radially extending slot in its rear face adapted to accommodate the lug of the cap for preventing rotation of the cap while permitting radial movement thereof; and a plurality of spring elements having their opposite ends seated within the pockets of the cage and cap and adapted to press the rear surface of the cage into leak-tight contact with an opposing plane surface of the machine element.

MAXWELL E. SALISBURY.